(12) United States Patent
Lin

(10) Patent No.: US 11,309,121 B2
(45) Date of Patent: Apr. 19, 2022

(54) MAGNETIC FIELD EFFICIENT INDUCTOR AND METHOD THEREOF

(71) Applicant: Realtek Semiconductor Corp., Hsinchu (TW)

(72) Inventor: Chia-Liang (Leon) Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 608 days.

(21) Appl. No.: 16/229,180

(22) Filed: Dec. 21, 2018

(65) Prior Publication Data

US 2020/0203059 A1     Jun. 25, 2020

(51) Int. Cl.
| | | |
|---|---|---|
| H01F 27/28 | (2006.01) |
| H01F 5/04 | (2006.01) |
| H01F 27/06 | (2006.01) |
| H01F 27/34 | (2006.01) |
| H01F 41/04 | (2006.01) |
| H01F 5/00 | (2006.01) |
| H01F 27/40 | (2006.01) |

(52) U.S. Cl.
CPC ......... *H01F 27/2847* (2013.01); *H01F 5/003* (2013.01); *H01F 5/04* (2013.01); *H01F 27/06* (2013.01); *H01F 27/2804* (2013.01); *H01F 27/34* (2013.01); *H01F 27/40* (2013.01); *H01F 41/041* (2013.01); *H01F 2027/065* (2013.01)

(58) Field of Classification Search
CPC ............. H01F 17/0006; H01F 17/0013; H01F 2027/2809; H01F 27/2804; H01F 5/003; H01F 27/2847; H01F 5/04; H01F 27/06; H01F 27/34; H01F 2027/065; H01F 27/40
USPC .................................. 336/200, 232; 257/531
See application file for complete search history.

(56) References Cited

U.S. PATENT DOCUMENTS

| | | | |
|---|---|---|---|
| 2016/0351309 A1* | 12/2016 | Caffee .................... H03B 5/00 |
| 2018/0316331 A1* | 11/2018 | Nakaiso .................. H03H 1/00 |
| 2019/0200454 A1* | 6/2019 | Liu ....................... H01F 41/041 |

FOREIGN PATENT DOCUMENTS

CN         105023914 A    * 11/2015

* cited by examiner

*Primary Examiner* — Tszfung J Chan
(74) *Attorney, Agent, or Firm* — McClure, Qualey & Rodack, LLP

(57) ABSTRACT

An inductor includes a coil configured in an open loop topology with a first multi-finger end and a second multi-finger end, wherein the fingers of the first end are disposed in interdigitating fashion with the fingers of the second end, and laid out on a first metal layer of a multi-layer structure; a plurality of pairs of metal strips laid out on a second metal layer of the multi-layer structure, wherein each of said plurality of pairs of metal strips comprises a first metal strip intersecting the first multi-finger end as seen from a top view and connecting to the first multi-finger end through a first set of vias, and a second metal strip intersecting the second multi-finger end as seen from the top view and connecting to the second multi-finger end through a second set of vias.

6 Claims, 4 Drawing Sheets

MAGNETIC FIELD EFFICIENT INDUCTOR AND METHOD THEREOF

BACKGROUND OF THE DISCLOSURE

Field of the Disclosure

The present disclosure generally relates to inductors, and more particularly to inductors integrated into resonant networks.

Description of Related Art

An inductor can be constructed using a multi-layer structure laid out on a silicon substrate. A layout of an inductor 110 is shown in FIG. 1. A legend is shown inside box 110LG. A top view is shown inside box 110TV. A side view is shown inside box 110SV. Inductor 110 comprises a coil 111 laid out on a first metal layer labeled by "M1" and configured in an open-loop topology comprising a first end E1 and second end E2, two metal strips including a first metal strip 112a and a second metal strip 112b laid out on a second metal layer labeled by "M2," a first via set 113 (comprising three vias by way of example in the figure) configured to connect the first metal strip 112a to the coil 111 at the first end E1, and a second via set 114 (comprising three vias by way of example in the figure) configured to connect the second metal strip 112b to the coil 111 at the second end E2. Coil 111, the two metal strips 112a and 112b, and the two via sets 113 and 114 are all embedded in a dielectric medium 115 fabricated on top of a substrate 116.

In practice, inductor 110 is integrated as part of a resonant network that includes a capacitor, wherein the capacitor is often laid out using a plurality of layers that include the second metal layer "M2" and at least an additional layer below the second metal layer "M2" that is not shown in FIG. 1. The first metal strip 112a and the second metal strip 112b serve as a first terminal and a second terminal, respectively, for the inductor 110 to connect to the capacitor to form the resonant network. The physical gap between the two metal strips 112a and 112b needs to accommodate with a physical dimension of the capacitor. For instance, if the capacitor's dimension is 80 μm by 80 μm as seen from the top view, the physical gap between the two metal strips 112a and 112b need to be approximately 80 μm. Incidentally, the physical gap between the two ends E1 and E2 is also approximately 80 μm. Therefore, a large gap between the two ends E1 and E2 is needed if the capacitor to be connected has a large horizontal dimension. A large gap between the two ends E1 and E2 reduces a magnetic flux that can be excited by the coil 111, thus degrading performance of inductor 110.

What is desired is an inductor that can maintain effectiveness in exciting magnetic flux when integrated in a resonant network.

SUMMARY OF THE DISCLOSURE

In an embodiment, an inductor comprises: a coil configured in an open loop topology with a first multi-finger end and a second multi-finger end, wherein the fingers of the first end are disposed in interdigitating fashion with the fingers of the second end, and laid out on a first metal layer of a multi-layer structure; and a plurality of pairs of metal strips laid out on a second metal layer of the multi-layer structure, wherein each pair of said plurality of pairs of metal strips comprises a first metal strip intersecting the first multi-finger end as seen from a top view and connecting to the first multi-finger end through a first set of vias, and a second metal strip intersecting the second multi-finger end as seen from the top view and connecting to the second multi-finger end through a second set of vias.

In an embodiment, a method comprises: laying out a coil configured in an open loop topology with a first multi-finger end and a second multi-finger end, wherein the fingers of the first end are disposed in interdigitating fashion with the figures of the second end, and laid out on a first metal layer of a multi-layer structure; laying out a plurality of pairs of metal strips on a second metal layer of the multi-layer structure, wherein each pair of said plurality of pairs of metal strips comprises a first metal strip intersecting the first multi-finger end and a second metal strip intersecting the second multi-finger end as seen from a top view; connecting the first metal strip to the first multi-finger end using a plurality of vias for each pair of said plurality of pairs of metal strips; and connecting the second metal strip to the second multi-finger end using a plurality of vias for each pair of said plurality of pairs of metal strips.

DETAILED DESCRIPTION OF THIS DISCLOSURE

The present disclosure is directed to inductors. While the specification describes several example embodiments of the disclosure considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the disclosure.

Persons of ordinary skill in the art understand terms and basic concepts related to microelectronics that are used in this disclosure, such as "inductor," "capacitor," "magnetic flux," "resonant network," "dielectric," and "substrate." Terms and basic concepts like these are apparent to those of ordinary skill in the art and thus will not be explained in detail here.

Figure 2A:
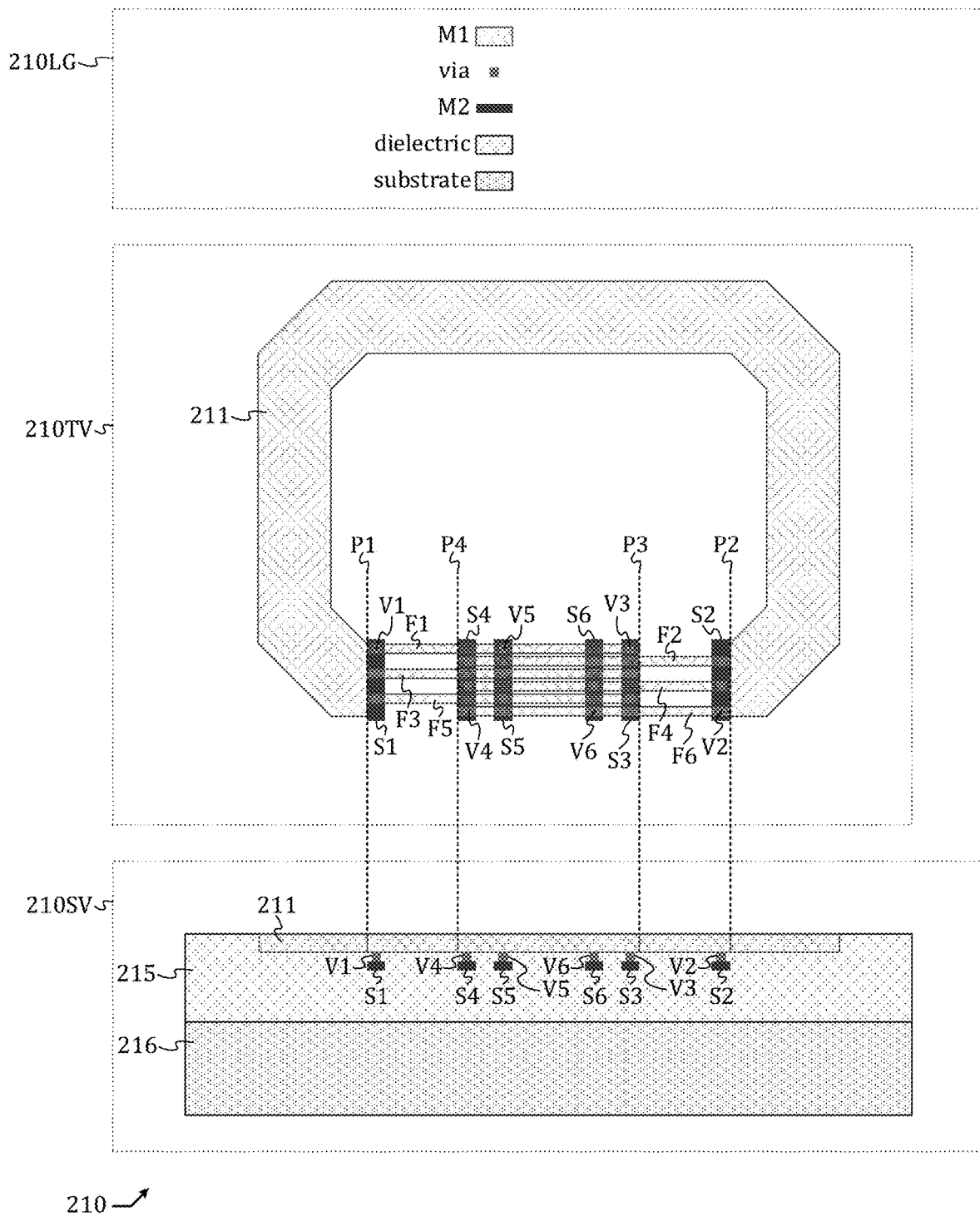
FIG. 2A shows a layout of an inductor in accordance with an embodiment of the present invention.

A layout of an inductor 210 in accordance with an embodiment of the present invention is shown in FIG. 2A. Inductor 210 is laid out on a multi-layer structure including a first metal layer labeled by "M1" and a second metal layer labeled by "M2." A legend is shown inside box 210LG. A top view is shown inside box 201TV. A side view is shown inside box 210SV. Inductor 210 comprises: a coil 211 laid out on the first metal layer "M1" and configured in an open loop topology with a first multi-finger end and a second end multi-finger end that are interdigitating one another, wherein the first multi-finger end comprises three fingers F1, F3, and F5, by way of example but not limitation, extending from plane P1 to plan P3, while the second multi-finger end comprises three fingers F2, F4, and F6, by way of example but not limitation, extending from plane P2 to plane P4; a first metal strip S1 laid out on the second metal layer "M2" in close proximity to plane P1 and intersecting the first multi-finger end; a first via set (comprising three vias, by way of example but not limitation, that include via V1 and two other vias that are not labeled due to tight space in the figure) configured to connect the first metal strip S1 to the first multi-finger end; a second metal strip S2 laid out on the second metal layer "M2" in close proximity to plane P2 and intersecting the second multi-finger end; a second via set (comprising three vias, by way of example but not limitation, that include via V2 and two other vias that are not labeled due to tight space in the figure) configured to connect the second metal strip S2 to the second multi-finger end; a third metal strip S3 laid out on the second metal layer "M2" in close proximity to plane P3 and intersecting the first multi-finger end; a third via set (comprising three vias, by way of example but not limitation, that include via V3 and two other vias that are not labeled due to tight space in the figure) configured to connect the third metal strip S3 to the first multi-finger end; a fourth metal strip S4 laid out on the second metal layer "M2" in close proximity to plane P4 and intersecting the second multi-finger end; a fourth via set (comprising three vias, by way of example but not limitation, that include via V4 and two other vias that are not labeled due to tight space in the figure) configured to connect the fourth metal strip S4 to the second multi-finger end; a fifth metal strip S5 laid out on the second metal layer "M2" between plane P4 and plane P3 but closer to plane P4 than to plane P3 and intersecting the first multi-finger end; a fifth via set (comprising three vias, by way of example but not limitation, that include via V5 and two other vias that are not labeled due to tight space in the figure) configured to connect the fifth metal strip S5 to the first multi-finger end; a sixth metal strip S6 laid out on the second metal layer "M2" between plane P4 and plane P3 but closer to plane P3 than to plane P4 and intersecting the second multi-finger end; and a sixth via set (comprising three vias, by way of example but not limitation, that include via V6 and two other vias that are not labeled due to tight space in the figure) configured to connect the sixth metal S6 to the second multi-finger end. The components and structures described above are embedded in a dielectric medium 215 fabricated on top of a substrate 216.

Figure 1:
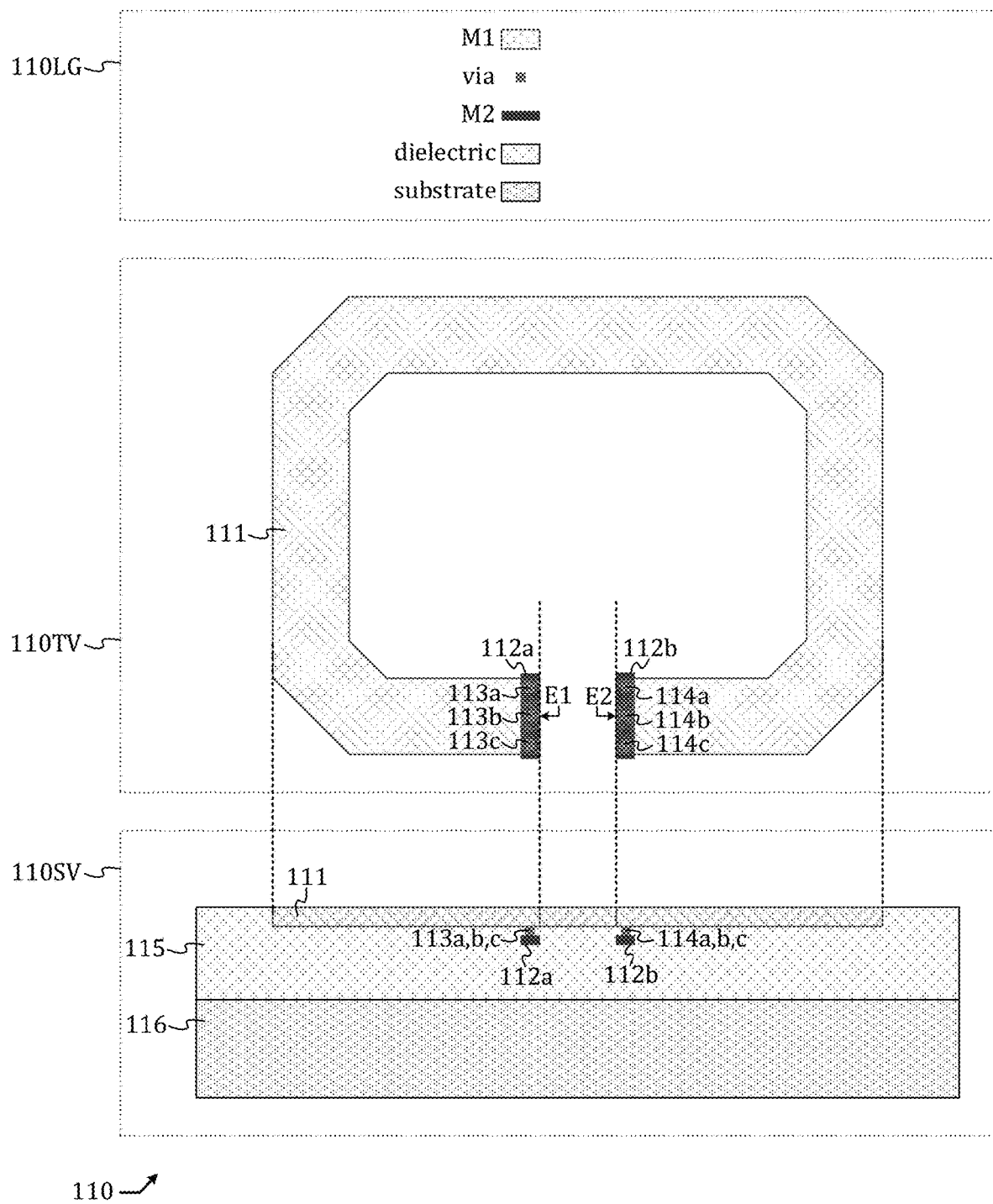
FIG. 1 shows a layout of a prior art inductor.
Figure 2B:
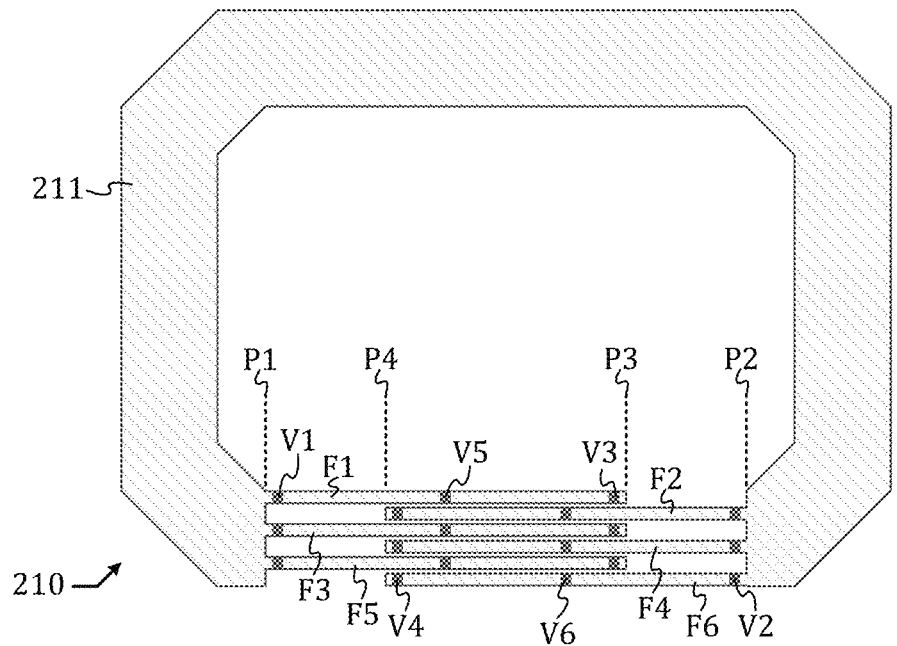
FIG. 2B shows a supplemental top view of the inductor of FIG. 2A.
Figure 2C:
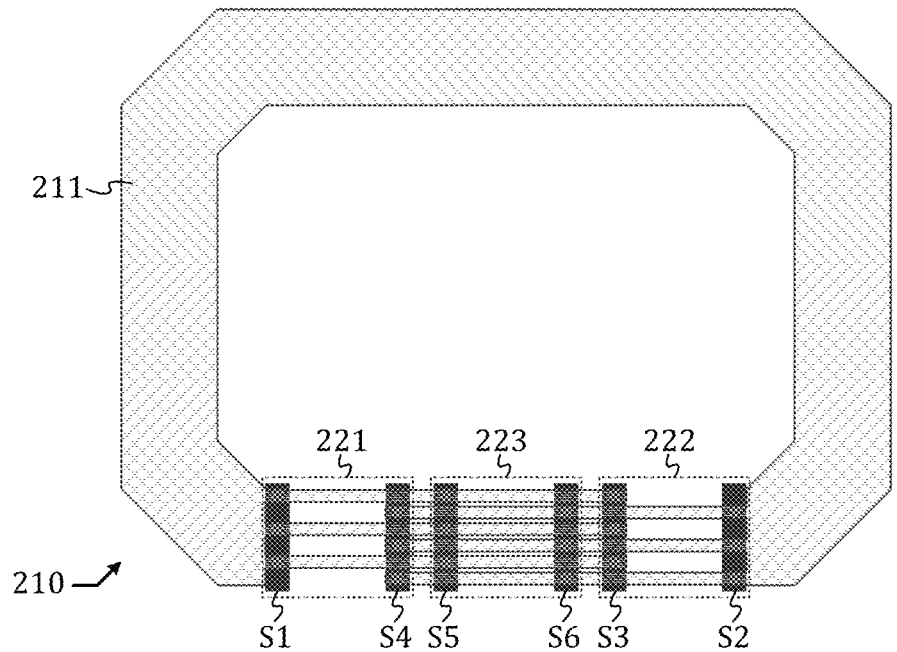
FIG. 2C shows another supplemental top view of the inductor of FIG. 2A.
Figure 3:
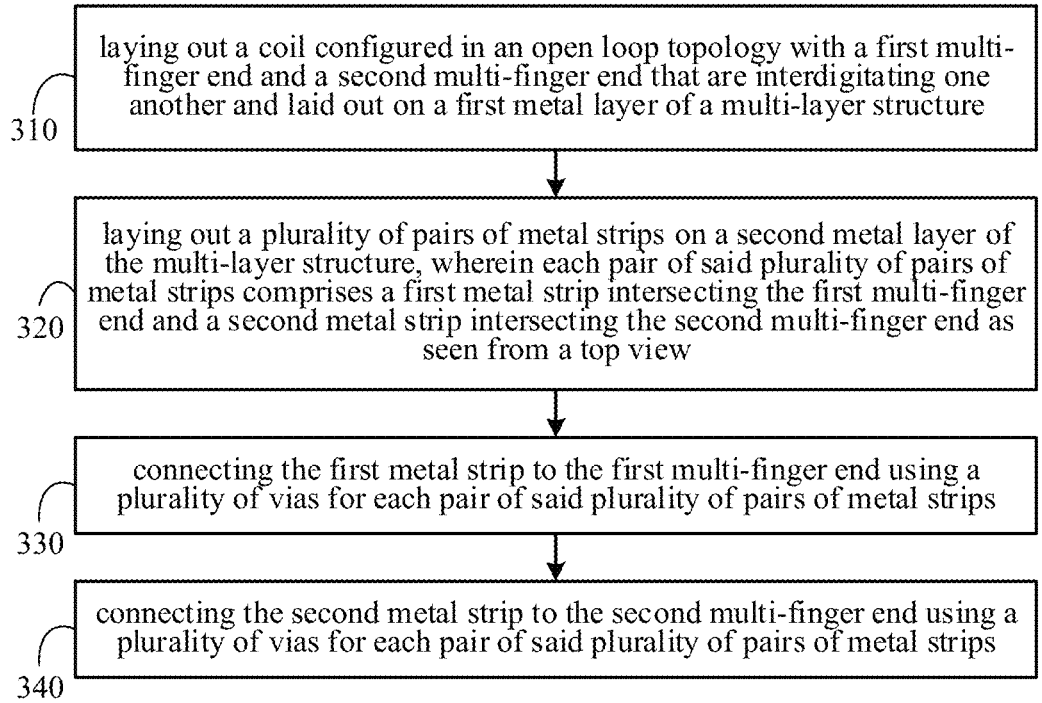
FIG. 3 shows a flow diagram of a method in accordance with an embodiment of the present invention.

To illustrate more clearly, the multi-finger interdigitating topology, a supplementary top view is shown in FIG. 2B. Due to using the multi-finger interdigitating topology, coil 211 does not have a physical gap such as that in the case of inductor 110 of FIG. 1 that will otherwise reduce magnetic flux and thus degrade performance. Another supplemental top view is shown in FIG. 2C. When incorporated in a resonant network, inductor 210 provides three pairs of terminals to connect to three capacitors including a first capacitor, a second capacitor, and a third capacitor, respectively. The first metal strip S1 and the fourth metal strip S4 form a first pair of terminals that can be used to connect to a first capacitor laid out in a first region 221. The third metal strip S3 and the second metal strip S2 form a second pair of terminals that can be used to connect to a second capacitor laid out in a second region 222. The fifth metal strip S5 and the sixth metal strip S6 form a third pair of terminals that can be used to connect to a third capacitor laid out in a third region 223. Due to the multi-finger interdigitating topology, the three capacitors are effectively connected in parallel. If a total capacitance of 3 pF, for instance, is needed for the resonant network, each of the three capacitors can be 1 pF. This way, a large capacitance can be formed using a plurality of small capacitors that are distributed and connected to the coil in a distributed manner. The three capacitors laid out in the three regions 221, 222, and 223 can be laid out using a plurality of metal layers including the second metal layer "M2" and at least an additional metal layer (not shown in figure) below the second metal layer "M2."

Although coil 211 is a single-turn coil laid out on a single layer (i.e. the first metal layer "M1"), it is by way of example but not limitation. Those skilled in the art can employ a plurality of turns using a plurality of metal layers in a way known in the prior art to embody a coil, provided the coil has a first multi-finger end and a second multi-finger end that are interdigitating one another, and a plurality of pairs of metal strips are laid out, wherein each pair of said plurality of pairs of metal strip comprises a first metal strip intersecting the first multi-finger end of the coil and connected to the first multi-finger end through a first via set, and a second metal strip intersecting the second multi-finger end of the coil and connected to the second multi-finger end through a second via set. To form a resonant network, each pair of metal strips is connected to a respective capacitor.

As illustrated by a flow diagram 300 shown in FIG. 5 a method in accordance with an embodiment of the present invention comprises the following steps: (step 310) laying out a coil configured in an open loop topology with a first multi-finger end and a second multi-finger end that are interdigitating one another and laid out on a first metal layer of a multi-layer structure; (step 320) laying out a plurality of pairs of metal strips on a second metal layer of the multi-layer structure, wherein each pair of said plurality of pairs of metal strips comprises a first metal strip intersecting the first multi-finger end and a second metal strip intersecting the second multi-finger end as seen from a top view; (step 330) connecting the first metal strip to the first multi-finger end using a plurality of vias for each pair of said plurality of pairs of metal strips; and (step 340) connecting the second metal strip to the second multi-finger end using a plurality of vias for each pair of said plurality of pairs of metal strips.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An inductor comprising:
   a coil configured in an open loop topology with a first end and a second end, each end having multiple fingers, wherein fingers of the first end are disposed in interdigitating fashion with fingers of the second end, and laid out on a first metal layer of a multi-layer structure; and
   a plurality of pairs of metal strips laid out on a second metal layer of the multi-layer structure, wherein each pair of said plurality of pairs of metal strips comprises a first metal strip intersecting the first multi-finger end as seen from a top view and connecting to the first multi-finger end through a first set of vias, and a second metal strip intersecting the second multi-finger end as seen from the top view and connecting to the second multi-finger end through a second set of vias;
   wherein each pair of metal strips is laid out in a lateral zone as seen from the top view, not overlapping with a zone of any other pair of metal strips, and each metal strip is configured to be connected to an end of a capacitor, such that the metal strips of each pair of metal strips are configured for connection to a single capacitor, wherein intersecting connection points of the metal strips and the multiple fingers are configured such that the capacitor connected to each pair of metal strips is connected in parallel with the other connected capacitors.

2. The inductor of claim 1, wherein the multi-layer structure is embedded in a dielectric medium placed upon a substrate.

3. The inductor of claim 1, wherein each pair of said plurality of pairs of metal strips is connected to the respective capacitor to form a resonant tank.

4. A method comprising:
   laying out a coil configured in an open loop topology with a first end and a second end, each end having multiple fingers, wherein fingers of the first end are disposed in interdigitating fashion with fingers of the second end, and laid out on a first metal layer of a multi-layer structure;
   laying out a plurality of pairs of metal strips on a second metal layer of the multi-layer structure, wherein each pair of said plurality of pairs of metal strips comprises a first metal strip intersecting the first multi-finger end and a second metal strip intersecting the second multi-finger end as seen from a top view;
   connecting the first metal strip to the first multi-finger end using a plurality of vias for each pair of said plurality of pairs of metal strips; and
   connecting the second metal strip to the second multi-finger end using a plurality of vias for each pair of said plurality of pairs of metal wherein each pair of metal strips is laid out in a lateral zone as seen from the top view, not overlapping with a zone of any other pair of metal strips, and each metal strip is configured to be connected to an end of a capacitor, such that the metal strips of each pair of metal strips are configured for connection to a single capacitor, wherein intersecting connection points of the metal strips and the multiple fingers are configured such that the capacitor connected to each pair of metal strips is connected in parallel with the other connected capacitors.

5. The method of claim 4, wherein the multi-layer structure is embedded in a dielectric medium placed upon a substrate.

6. The method of claim 4, wherein each pair of said plurality of pairs of metal strips is connected to the respective capacitor to form a resonant tank.

\* \* \* \* \*